Patented July 26, 1949

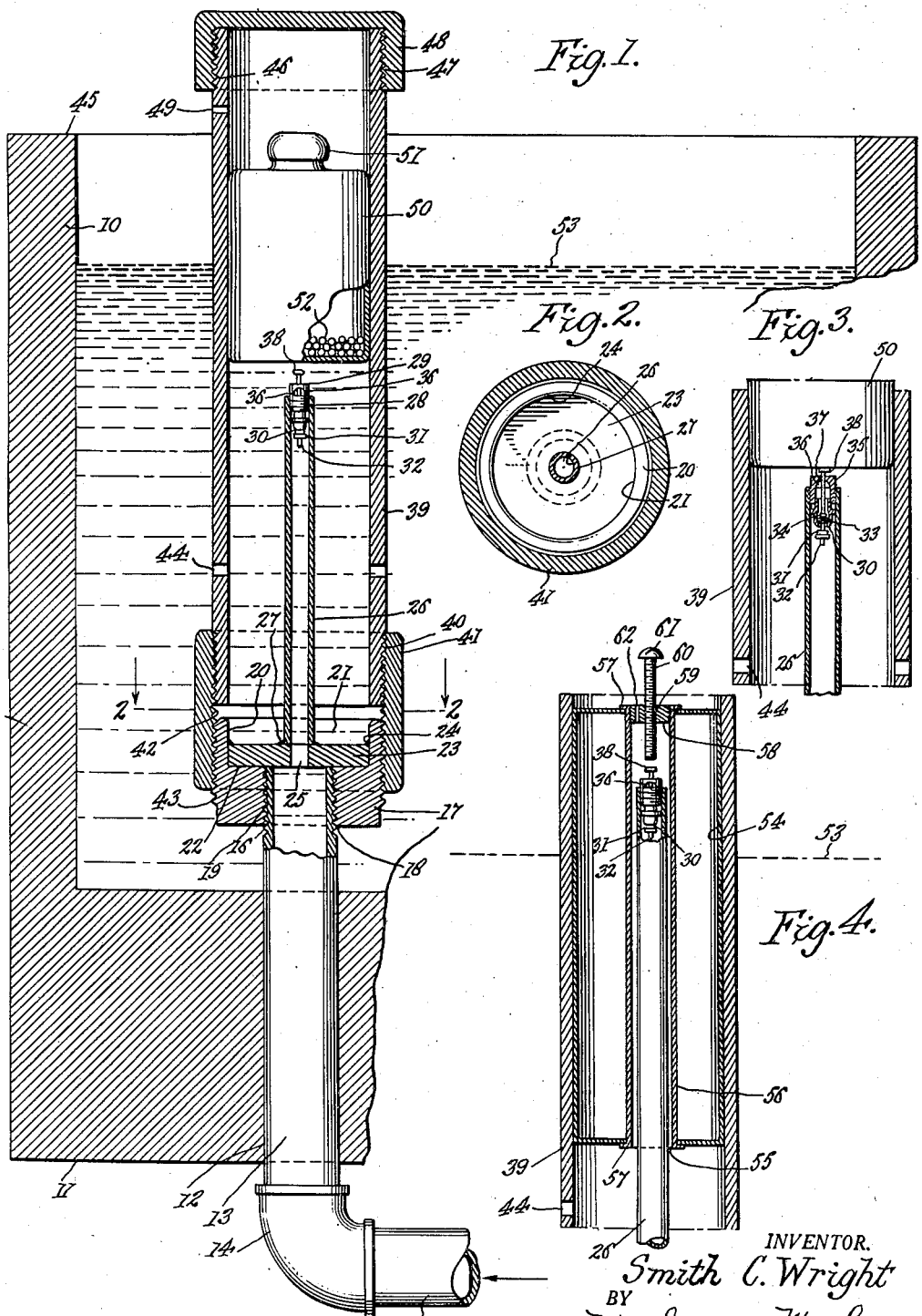

2,477,224

UNITED STATES PATENT OFFICE 2,477,224

TROUGH OR TANK WATER LEVEL VALVE

Smith C. Wright, Bandera, Tex.

Application January 2, 1948, Serial No. 336

4 Claims. (Cl. 137—104)

The present invention relates to improvements in trough or tank water level valve for regulating the flow of water into stock watering troughs, water closets, commode tanks and the like.

Heretofore, the float actuated valves employed in the above devices have been of the type in which the float operated indirectly upon the valve through linkage or float arms. Such previous structures have been prone to break or become disaligned in the normal service for which they were intended resulting in the loss of use of the device with its attendant inconvenience and cost of repair.

It is one of the objects of the present invention to eliminate the disadvantages of the prior devices by providing an improved water level maintainer in which the float comes into direct contact with the valve stem to urge the valve to its open position to permit the flow of the water to the container.

Another object of the present invention is to provide an improved water level maintainer which is instantly responsive to changes in the water level in the container so that there is a minimum of delay in the opening and closing movements of the valve.

The present invention aims to provide an improved device of this type which as a unit may be quickly and easily attached to or detached from a standard water supply pipe.

A further aim of the present invention is to provide an improved device of this character which is simple in construction and operation and is economical to manufacture and in which the cost of maintenance is negligible.

A still further object of the present invention is to provide an improved water level maintainer which is self-contained, the operating parts of which are covered and thus protected against the entrance of foreign matter and against damage by the animals drinking from the trough.

Another aim of the present invention is to provide an improved water level maintainer in which the water in the tank is prevented from siphoning back into the water line. This is of great advantage when the improved device is used in connection with water closets, commodes and the like.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a vertical sectional view of the improved valve shown as applied to an animal watering trough with parts broken away and parts shown in section;

Figure 2 is a transverse sectional view taken on the line 2—2 of Figure 1;

Figure 3 is a fragmentary vertical sectional view of the improved valve showing the valve in its open position;

Figure 4 is a fragmentary vertical sectional view of a modified form of the improved valve.

Referring more particularly to the drawings, 10 designates a water or other liquid tank which, in the form of the invention shown in Figures 1 to 3, is a drinking water trough for livestock or other domestic animals. The tank or trough 10 has a bottom 11 which is provided with a vertically extending through passageway 12. A stand-pipe 13 is received by the passageway 12 and its lower end extends below and outwardly of the bottom 11 of the tank and is connected by an elbow fitting 14 to a water supply main 15.

The upper end of the pipe 13 is externally screw threaded as at 16. An adapter 17 annular in cross section has a centrally disposed through bore 18 having internal screw threads 19 which engage the threads 16 on the pipe 13 for detachably mounting the adapter on the pipe 13. The adapter has an upstanding peripheral annular flange 20 thereby providing a socket 21 having a bottom 22 for receiving a plug 23 which is round in cross section. The plug 23, which is received by the socket 21, seats upon the bottom 22 of the socket; and its side wall has a snug fit with the interior wall of the flange 20. The plug is secured to the adapter by welding or the like as indicated at 24 to provide a water-tight joint between the plug and the adapter. A centrally disposed opening 25 of less diameter than the bore 18 of the adapter and the pipe 13 extends through the plug 23 and communicates with the pipe 13.

A vertically extending tube 26, open at both ends, has its lower end welded as at 27 to the upper face of the plug 23 in registry with the opening 25 in the plug to provide a water-tight joint between the plug and tube. The upper end of the tube 26 is internally screw threaded at 28 to detachably receive a valve cage and guide 29 having at its lower end a valve seat 30 against which a valve head 31 carried by a valve stem 32 normally seats under the influence of a coil spring 33 which is confined between the bottom of the valve cage and a collar 34 on the valve stem. The upper end of the valve cage extends above the upper end of the tube 26 and terminates in a head 35 having openings 36 for the discharge of water when the valve is open. The valve stem 32 extends upwardly a short distance beyond the head 35 through a bore 37 therein and terminates in an enlarged button 38 which has a diameter larger than that of the bore 37.

A vertically disposed protective cylindrical housing 39 which is open at both ends envelops the valve and tube 26 and is provided at its lower end with external screw threads 40. The housing 39 is connected to the adapter 17 by a coupling or connector 41 having screw threads 42 which engage screw threads 43 on the exterior of the adapter 17 and the threads 40 of the housing 39.

At points above the coupling 41, the housing 39 is provided with a plurality of water discharge openings 44. The upper end of the housing extends beyond the upper edge 45 of the tank 10 and is provided with screw threads 46 to engage the screw threads 47 of a cover 48. Between the lower edge of the cover and the upper edge of the tank, the housing 39 is provided with an air vent 49.

An air-tight float 50 is arranged within the housing 39 above the valve stem 32 and is provided with a removable cap 51. The weight of the float is adjusted by the amount of lead shot or other suitable material 52 which is introduced into the float when the cap 51 is removed.

In the operation of the device, assuming that the tank 10 is empty, the float 50 will fall by gravity into engagement with the button 38 of the valve stem 32 and depress the stem against the action of the coil spring 33 to unseat the valve head 31 as shown in Figure 3. The water from the main 15 will flow through the pipe 13, plug 23, tube 26, valve cage 29 and openings 36 in the valve cage head 35 into the housing 39. Water will pass from the housing through the openings 44 into the tank 10.

When the water has reached a level, indicated at 53, which has been predetermined by the weight of lead shot 52 previously placed within the float 50, the water in the housing 39 will raise the float by buoyancy out of engagement with the valve stem. The valve head 31, under the influence of the spring 33 and the pressure of the water from the main 15, will return to its seat 30 and the discharge of water to the tank will be stopped. Whenever the water in the tank falls below the preselected level, the float will sink and engage the valve stem to open the valve and maintain the valve in its open position until the preselected water level has been re-established, at which time the float will again be buoyed up and the valve will close.

The greater the weight of shot placed in the float the higher will be the water level maintained in the tank. The removal of the cover 48 will afford access to the float. The housing acts as a guide for the float in its up and down movements and protects the valve and the float from damage by the animals using the trough. The housing also prevents dirt and debris from clogging up the valve and the system.

It will be noted from the above description that all of the parts of the improved water level maintainer are carried by the adapter 17 which is mounted upon the stand-pipe 13. Thus there is provided an improved water level maintainer which as a unit can be quickly mounted upon, and demounted from, the usual stand-pipe.

The form of the invention shown in Figure 4 is particularly adapted for use with water closets, commode tanks and the like. In this form of the invention the structure of the float is different from that illustrated in Figures 1 to 3, inclusive, the other parts being the same.

In Figure 4, the float is indicated at 54 and is provided with a central bore 55 in which is disposed a sleeve 56 having an outturned annular flange 57 at each end. These flanges are secured to the float as by brazing or the like. A bushing 58 is screw threaded into the upper end of the sleeve 56 and is provided with a centrally disposed screw threaded opening 59 which receives an adjusting screw 60. The screw 60 is provided with a kerf 61 which is adapted to receive a screw driver or the like for adjusting the screw towards and from the button 38 on the valve stem 32. The bushing 58 is provided with an air vent 62.

It will be noted that in the modification illustrated in Figure 4 the valve is located above the water level 53 in the tank 10. This is effected by increasing the length of the tube 26. Such an arrangement will prevent the water in the tank 10 from siphoning back into the main water line 15.

The operation of the modification shown in Figure 4 is the same as structure illustrated in Figures 1 to 3, inclusive, except that, instead of varying the amount of lead shot to determine the water level, the screw 60 can be adjusted towards or away from the button 38 on the valve stem 32.

It will be noted from Figure 4 that the internal diameter of the sleeve 56 substantially exceeds that of the outside diameter of the tube 26 to provide an annular passage for the water downwardly to the water discharge openings 44 in the external housing 39 in which the float 54 vertically slides.

While I have disclosed herein the best forms of the invention known to me at the present time, I desire it to be understood that I reserve the right to make changes and modifications in the herein described embodiments of the invention provided such changes fall within the scope of the following claims.

What I claim is:

1. For use with an animal drinking trough, commode or the like having a tank for containing water and a stand-pipe connected to a main supply of water, a water level maintainer comprising an adapter adapted to be attached to the stand-pipe, a first vertically extending tube having openings through the side walls thereof, a coupling joining said adapter and first tube with the upper end of said first tube located above the predetermined water level in the tank, a second vertically extending tube lesser in length than said first tube within said first tube and having an internal diameter less than that of said stand-pipe and being carried by said adapter, a spring biased normally closed valve carried by the upper end of said second tube, and a float carried within said first vertically extending tube, said float adapted to reciprocate within said first tube and so positioned to contact said normally closed spring biased valve carried by the upper end of said second tube when the water level in said tank falls below a predetermined level, the water in said tank communicating with said float through the openings in the side walls of said first vertically extending tube.

2. A water level maintainer as claimed in claim 1 further comprising a removable cap for said first vertically extending tube permitting access to said float and valve.

3. A unitary water level maintainer adapted to be attached to a water supply main comprising an adapter having means for removably connecting the same to the main as a support and having an upstanding flange at its outer margin providing an internal socket having a bottom wall, a plug seated on said bottom wall and affixed in said socket, said plug having an opening therethrough smaller in diameter than that of the water main, a small vertical tube having an internal diameter substantially equal to that of said plug opening carried by and upstanding from said plug and in communication with the opening, a valve core carried by the upper portion of said small vertical tube, a large vertical tube of substantially greater diameter than said small vertical tube surrounding the same and having openings for the escape of water therefrom, a coupling for connecting the lower portion of said large vertical tube to said adapter, a float movably mounted for reciprocating movement in the upper portion of said large vertical tube in operative relation to said valve core, said large vertical tube having an air breathing opening therethrough above the operative limits of movement of said float.

4. A water level maintainer as claimed in claim 3 wherein said float is of a variable ballast for predetermining the height of water in the tank.

SMITH C. WRIGHT.

REFERENCES CITED

The following references are of record in the file of this patent:

UNITED STATES PATENTS

| Number | Name | Date |
|---|---|---|
| 1,259,791 | Simmons | Mar. 19, 1918 |
| 1,589,786 | Bradshaw | June 22, 1926 |
| 1,982,062 | Mathews | Nov. 27, 1934 |